United States Patent Office 3,413,437
Patented Nov. 26, 1968

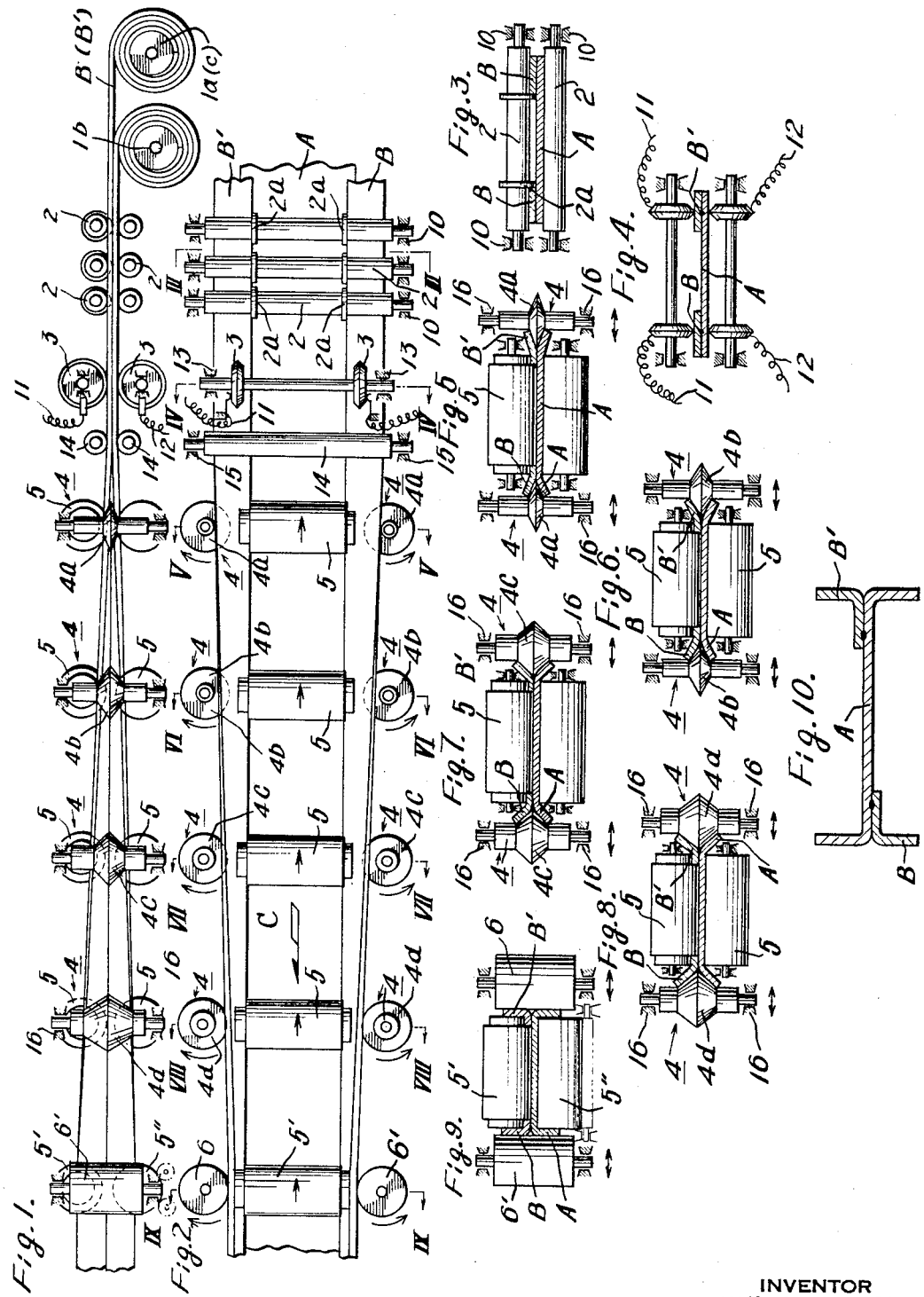

3,413,437
APPARATUS FOR THE CONTINUOUS MANUFAC-
TURE OF LIGHTWEIGHT AND COMPOSITE
METALLIC I-BEAMS
Kineo Hamamoto and Shuji Uchida, Tokyo, Japan, assignors to Nippon Kokan Kabushiki Kaisha, Tokyo, Japan
Filed Apr. 13, 1966, Ser. No. 542,268
Claims priority, application Japan, Apr. 15, 1965, 40/22,041
6 Claims. (Cl. 219—81)

ABSTRACT OF THE DISCLOSURE

Apparatus for continuous manufacturing of light weight and composite I-beams, wherein a wide strip of steel and two narrow strips of steel are simultaneously uncoiled and fed in superimposed relation with each other with an edge of each narrow strip being disposed in alignment with an opposite edge of the wide strip. The narrow strips are then welded to the wide strip inwardly of the outermost edge of the wide strip and the unwelded portions of the superimposed strips are separated and bent apart from each other to form oppositely extending flanges on opposite edges of the wide strip to form an I-beam.

This invention relates to an apparatus for the continuous manufacture of light weight and composite metallic I-beams.

The conventional plant heretofore employed in the art for the continuous manufacture of steel I-beams on a large production scale is based almost exclusively on the rolling technique.

A main object of the present invention is to provide an apparatus for the continuous manufacture of steel and other metallic I-beams of light weight and composite type from strip coils at a high production efficiency.

Various further and specific objects, features and advantages of the invention will more fully appear as the description proceeds.

For the realization of the aforementioned unique objects, the apparatus according to the invention for the continuous manufacture of light weight and composite metallic I-beams, is characterized by the provision, in combination, of uncoilers for delivery of a main broad metallic strip and two narrower side metallic strips in a continuous manner; positioning means for arranging said side strips on said main strip in an overlapped manner, each of said side strips at its outside edge lying in coincidence with a longitudinal side edge of said main strip; welding means for uniting longitudinally together part of the strips at the thus overlapped area; and a plurality of separated forming roller groups for forcibly opening the overlapped side edges of the strip assembly from outside, while pressing together main longitudinal portion of the assembly from its both surfaces, so as to form side flanges at the both longitudinal sides of the assembly, so as to form a continuous elongated I-beam.

A preferred embodiment of the invention resides in such an apparatus of the kind, which comprises in combination: three uncoilers for delivering continuously a main broad metallic strip and two narrower auxiliary side metallic strips; positioning and arranging means, preferably shaped in a plurality of flanged-guide rolls, for said strips in such a way that said side strips are kept in parallel and overlapped relation with said main strip and in separated relation from each other; welding elements for uniting both side strips with said main strip by performing a welding procedure in the neighborhood of the inside longitudinal side edge of each of said side strips; a number of pairs of flange-forming-rolls arranged in the neighborhood of the both side edges of the thus partially united strip assembly, for invading forcibly into the outer gaps formed between each side of the side strips and the main strip for the formation of side flanges at the both sides of a main longitudinal part of said main strip; and pressure roller means arranged along the longitudinal and central axis of the main strip and within the region wherein the said flange-forming operation is carried into effect, so as to exert pressure for avoiding possible dismantling of said strip assembly during the aid flange-forming operation due to dismantling acting force exerted by said flange-forming rolls. It may be naturally supposed that the aforementioned working constituents of the apparatus are arranged in line with the production line, when seen as a whole.

For completing the inventive apparatus, there must be provided drive means for continuously delivery of the respective strips in common. As a most preferable means for this purpose, several of the pressure rollers may be positively driven through suitable transmission gearing from a prime mover, preferably an electric motor. Other conventional strip drive means as commonly employed in the cold-rolling plant for the manufacture of metallic strips may be employed with equal results.

For the welding means, a pair of welding roller electrodes is preferably employed, which rollers may be preferably of twin disc type as will be more fully described hereinafter. In this case, two separated weld seams may be formed. But, it will be clear from the foregoing that any conventional spot welders may be equally employed for practising the invention.

In order that the invention may be more clearly understood and readily carried into effect, it will now be described more fully with reference to the accompanying drawing, wherein:

FIG. 1 shows a schematic side view of a preferred embodiment of the manufacturing apparatus according to the invention.

FIG. 2 is a schematic top plan view of essential parts thereof.

FIGS. 3–10 are cross-sectional views taken substantially along lines III—III, IV—IV, V—V, VI—VI, VII—VII, VIII—VIII, IX—IX and X—X shown in FIGS. 1–2, respectively.

In FIG. 1, there is shown only schematically two uncoilers 1a and 1b, although a further uncoiler is mounted coaxially with the latter uncoiler 1b as hinted by reference symbol 1c in the same figure. These uncoilers, carrying thereon respective coil strips, are of the conventional design which is broadly employed in steel sheet manufacturing lines, and mounted freely rotatably so as to be adapted for delivery of respective steel strips A, B and B', respectively. Bearing means and the like conventional appliances allowing the free rotation of these uncoilers at their specifically determined zone, in this case at the right-hand side of FIG. 1, are not shown on account of their high familiarity to those skilled in the art and at the same time for simplicity of the drawing. As seen, the strip A is arranged centrally between the side strips B and B' and broader in its width than the respective width of the latter two. The uncoilers 1a, 1b and 1c are so arranged that the delivered side strips B and B' are overlapped on the side marginal areas on the upper surface as shown (or alternatively on the bottom surface, although not shown) of the main or central strip A.

While keeping this overlapped condition, the delivered strips are straightened by a plurality, herein shown three by way of example, of couples of leveller rolls denoted commonly by a same reference numeral 2, each having a pair of positioning flanges 2a which serve for positively and accurately guiding the inner side edges of the advancing side strips B and B' so as to keep the latter separated a predetermined mutual distance. These leveller rolls 2 are normally mounted freely rotatably in respective bearings, only schematically illustrated and attached again with a common numeral at 10. The aforementioned overlapped condition of the three steel strips which are being subjected to straightening and positioning efforts provided by the leveller rolls is most clearly seen from FIG. 3. The lower leveller rolls are preferably designed as plain cylindrical rollers as shown in FIG. 3, for intensifying the desired straightening effect. Although not shown, these rolls 2 may be positively driven through a transmission gearing from a prime mover, preferably an electric motor. In this case, the leveller rolls serve at the same time as for strip delivery rolls.

At a short distance, when seen in the strip advancing direction or from right to left in FIGS. 1–2, from the leveller rollers, there is provided a pair of roller electrodes attached with a common reference numeral 3 for clarification, each of these rollers being formed in a twin disc type. These roller electrodes 3 are kept in rolling contact respectively with the upper and the lower surface of the strip assembly at predetermined points nearer to the inner side edges of the auxiliary strips B and B'. For this purpose, the extreme ends are reduced and rotatably mounted in respective bearings at 13 which are only schematically shown. These rotary electrodes 3 are electrically connected through respective leads 11 and 12 and a conventional welding transformer, not shown, to an A.C. main, for reception of the welding current. In practice, however, the leads 11 and 12 are connected through the intermediary of conventionally employed slip ring- and brush-arrangements, although not precisely shown on account of its highly similarity.

With use of the roller electrodes 3, two continuously welded seams are produced longitudinally of the strip assembly in the overlapped side areas and nearer to the inside side edges of the auxiliary strips, as most clearly seen from FIG. 4. Instead of the continuously workable welding means described so far, any conventional spot welder may be employed for the generation of interruptedly welded seam lines.

At a distance from the rotary electrodes 3, when seen in the progressing direction of the strip assembly, there is provided a pair of pressure rolls at 14, which are mounted freely rotatably and kept in pressurized rolling contact with the upper and the lower surface of the assembly. These rolls 14 are mounted at their extremities in bearings 15 which are only schematically shown. Although not shown, these rolls 14 are provided with pressure means which are highly conventional, for instance, in the manufacture of cold-rolled steel stocks and therefore omitted from the drawing for simplicity thereof.

It should be noted that the welded strip assembly emerging from between the pressure rolls 14 represents at each of their outermost edges a small gap substantially in the shape of a horizontal V on account of thermal stresses developed in the course of the welding station at 3.

As seen in the left-hand side of FIGS. 1–2, there is provided a flange-forming station which comprises two rows of flanging rolls affixed with a common reference 4 and in this case arranged in four stages along the both sides of the strip assembly. The first couple of these rolls 4 is formed with shaping flanges 4a each having a smaller thickness than that of the corresponding flanges at 4b of the second roller stage which may clearly be seen from comparison of FIG. 5 with FIG. 6. In the same way, the thicknesses of shaping flanges at 4b, 4c and 4d in the next succeeding flanging roller stages are gradually increased as clearly seen from FIGS. 6–8. Each row of these rolls 4 is rotatably mounted in respective bearings which are affixed with a common reference numeral 16 throughout several cross-sectional views of FIGS. 5–8, as well as in the side view of FIG. 1, yet omitted from FIG. 2 for clarification thereof.

In the progress of the flange-forming steps as seen successively from FIG. 5 to FIG. 8, the opening gaps seen at the both side edges of the strip assembly are gradually increased under the expanding action provided by the successively arranged flanging rolls 4.

For assisting this gap-enlarging and flanging operation, each row of the flanging rolls 4 is mounted movably in the lateral direction of the strip assembly, as hinted by small arrows in FIGS. 5–8.

The longitudinal row of these rolls 4 is arranged preferably to move in unison. For this purpose, each row of the flanging rolls 4 may be mounted on a carriage movable or adjustable in its position laterally of the strip assembly, although not shown. The number of the roller couples 4 may be modified according to occasional demands in connection with the product I-beam.

For assuring the aforementioned flanging fabrication, there is provided in the flange-forming station a pair of pressure rolls 5 arranged preferably in line with each pair of flanging rolls 4 when seen in the lateral direction of the strip assembly. Each of the lower pressure rolls 5 is preferably formed, in this embodiment, into a plain cylinder. But, each upper one of pressure rolls 5 is formed preferably in the shape of a stepped cylinder so as to exert substantially equal pressure upon the main portion of the main strip A as well as the side strips overlapped on and welded thereto in the aforementioned manner. Although not shown, one or more of the pressure rolls 5 may be of the positively driven type which are then driven through a proper gearing from a prime mover, preferably an electric motor, for urging the thus semi-fabricated, flanged strip assembly to advance continuously in the forward direction as hinted by an arrow C in FIG. 2.

At the terminal point or fourth roll stage in this flange-forming station, as shown in FIG. 8, the included angle of the shaping flanges 4d is selected to be nearer to 180 degrees so that the thus formed side flanges of the semi-fabricated composite I-beam includes the corresponding angle the apex of which lies in the horizontal plane passing through the middle axis of thickness of the main strip A. The provision of a series of couples of the pressure rolls 5 serves effectively to prevent otherwise possible separation of the welded seams. For this purpose, the length of the pressure roll 5 must be at least longer than the lateral distance between the longitudinally parallel welded seams.

At the final or finishing station, as most clearly seen in FIG. 9, the semi-fabricated side flanges of the strip assembly are finished to desired complete flanges. In this case, each of the flanging rolls is transformed into a cylinder roll at 6' for this purpose. These rolls are arranged also to be adjustable in the lateral direction of the strip assembly, as hinted by a similar double-headed arrow shown in FIG. 9. In the present station, pressure rolls 5' and 5" may be in practice of equal size and configuration as those of the preceding roll 5. All of the lower pressure or supporting rollers 5 are shaped preferably in plain cylindrical rolls as already mentioned which are nevertheless designated by the same reference numeral 5 for the simplicity of the drawing.

It will be clear that the output product delivered from the final finishing station is in the form of an elongated composite I-beam which may be cut in the succeeding cutting station, not shown, to a desired constant length. For this purpose, a conventional shearing machine may be provided. Additionally, although not shown, the pressure roller shafts are also mounted in end bearings which are arranged so as to avoid possible physical interference with the fabricated flanges of the product. In FIG. 10, the pressure rollers are shown somewhat smaller for simplicity of the drawing. However, the above-mentioned precautions must be incorporated for the realization of the present invention.

In FIG. 10, a modified product is schematically shown. In this case, one of the side strips as at B is placed underneath the main strip A. This modified product may be produced with substantially equal equipment as above-referred to, only by changing the delivering condition of the starting strips supplied from the respective uncoilers A, B and B'. In this case, the main strip A is shaped into a kind of Z-bar. Provision must also be made in such a way that the configuration of the pressure rolls 2 and 4 should be modified so as to adapt the modified demands in the finished product and the working levels of the both rows of flanging rolls 4 should be somewhat modified.

It is clear from the foregoing that with use of the apparatus according to this invention an elongated I-beam can be produced continuously and directly from metallic strip coils at a low production cost and at a high production efficiency with a simpler design of the manufacturing plant.

Though the invention has been described in some detail with respect to substantially a single embodiment disclosed herewith, it should be understood that variations thereto, altering the physical arrangement and combination of parts may be accomplished without departing from the spirit or scope of the invention, as set forth in the appended claims.

What we claim is:

1. Apparatus for the continuous manufacture of light weight and composite metallic I-beams, comprising in combination: a plurality of uncoilers positioned at one end of the apparatus for the delivery of a main broad metallic strip and two narrower metallic strips in parallel with each other and in a continuous manner; positioning means positioned in the rear of and separated from said uncoilers and provided for arranging said side strips on said main strip in an overlapped manner, each of said side strips at its outside edge lying in coincidence with a longitudinal side edge of said main strip mounted for uniting longitudinally together part of the strips at the thus overlapped area; and a plurality of separated forming roller groups for receiving said overlapped and welded strip assembly and for forcibly opening, enlarging and bending apart the overlapped side edges of the strip layers from outside, while pressing together main longitudinal portion of the strip assembly from its both surfaces, so as to form side flanges at the both longitudinal sides of the assembly, so as to form a continuous elongated I-beam at the terminal extremity of the apparatus.

2. Apparatus as claimed in claim 1, wherein said uncoilers are three in their number, two of which are arranged in line with each other when seen in the axial direction thereof.

3. Apparatus as claimed in claim 1, wherein a plurality of pairs of pressure and guiding rolls, preferably of the flanged design, keep the desired relation of the side strips relative to the main strip in the desired physical relation.

4. Apparatus as claimed in claim 1, wherein the welding means comprises a pair of rotary electrodes.

5. Apparatus as claimed in claim 1, wherein each of the forming-roller group is composed of a number of flanging rolls arranged along one side edge of the strip assembly in the rear of the welding means, said rolls having shaping flanges having gradually larger included angles, respectively.

6. Apparatus as claimed in claim 1, wherein in addition to each of said flanging rolls a pair of pressure rollers is provided in the neighborhood of each pair of the flanging rolls.

References Cited

UNITED STATES PATENTS

| | | | |
|---|---|---|---|
| 2,481,087 | 9/1949 | Crise | 219—83 |
| 3,059,319 | 10/1962 | Hart et al. | 29—480 X |
| 3,071,855 | 1/1963 | Mineah | 29—480 |

ANTHONY BARTIS, *Primary Examiner.*

BARRY A. STEIN, *Assistant Examiner.*